(12) United States Patent
Akiyama

(10) Patent No.: US 6,721,654 B2
(45) Date of Patent: Apr. 13, 2004

(54) NAVIGATION SYSTEM AND MEMORY MEDIUM STORING THE POSITION DATA OF THE SPECIFIC FACILITIES

(75) Inventor: Yoshikazu Akiyama, Ohta-ku (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/220,689
(22) PCT Filed: Apr. 25, 2001
(86) PCT No.: PCT/IB01/00686
  § 371 (c)(1),
  (2), (4) Date: Oct. 25, 2002
(87) PCT Pub. No.: WO01/81870
  PCT Pub. Date: Nov. 1, 2001

(65) Prior Publication Data
  US 2003/0093216 A1 May 15, 2003

(30) Foreign Application Priority Data
  Apr. 27, 2000 (JP) .................. 2000-127204

(51) Int. Cl.⁷ .................. G01C 21/34
(52) U.S. Cl. .................. 701/209; 701/201; 340/988; 455/558
(58) Field of Search .................. 701/117–119, 213, 701/207, 209, 214, 201; 342/4–57; 340/461, 425.5, 988, 901; 455/13.1, 41.1, 557, 7, 517, 558

(56) References Cited

U.S. PATENT DOCUMENTS

| 5,353,034 A | 10/1994 | Sato et al. | 342/457 |
| 5,948,040 A * | 9/1999 | DeLorme et al. | 701/201 |
| 6,202,023 B1 * | 3/2001 | Hancock et al. | 701/201 |
| 2002/0049535 A1 * | 4/2002 | Rigo et al. | 701/211 |
| 2002/0142803 A1 * | 10/2002 | Yamamoto | 455/557 |
| 2002/0197955 A1 * | 12/2002 | Witkowski et al. | 455/41 |
| 2003/0007261 A1 * | 1/2003 | Hutzel et al. | 359/871 |
| 2003/0065444 A1 * | 4/2003 | McCarthy et al. | 701/213 |

FOREIGN PATENT DOCUMENTS

| DE | 197 39 094 A1 | 3/1999 |
| JP | A 10-132585 | 5/1998 |
| WO | WO 99/45505 | 9/1999 |
| WO | WO 99/455505 | * 9/1999 |

* cited by examiner

Primary Examiner—Thomas G. Black
Assistant Examiner—Ronnie Mancho
(74) Attorney, Agent, or Firm—Oliff & Berridge PLC

(57) ABSTRACT

Memory mediums storing position data of specific facilities that can be read as position data of a destination on the map data of a vehicle navigation apparatus are distributed to users. When a user sets or inserts this memory medium to a fixed location of the navigation system, the position data of the specific facilities is read and set as the destination. Then the vehicle navigation apparatus starts route guiding to the destination. Arriving at the destination, the user can shop or obtain the benefit of discounts at the facilities (the shop) by using coupons for those shops, also stored on the memory medium.

14 Claims, 5 Drawing Sheets

NAVIGATION SYSTEM AND MEMORY MEDIUM STORING THE POSITION DATA OF THE SPECIFIC FACILITIES

BACKGROUND OF THE INVENTION

1. Field of Invention

This invention relates to an efficient technology for route guidance by a vehicle navigation system or by a hand-held navigation apparatus.

2. Description of Related Art

A vehicle navigation system, which guides a vehicle user by a specific route, recognizes the position where the vehicle is presently located by matching of map data stored in a memory such as a CD-ROM or a DVD-ROM and the GPS data. The system then calculates the route, and guides the user according to the calculated route to the destination from the current location.

In this situation, setting of the destination is made by the vehicle driver's or the navigator's option. It is common for the user to set the destination for sightseeing or shopping by selecting it, for example, from phone number data, longitude and latitude data, or from 'landmarks' included in the map data.

Thus, for example, the vehicle user who wants to go to a shop having a bargain sale, has to set the position of the shop as the destination to the vehicle navigation system based on the phone number data or landmark data before departure. The user will then arrive at the shop, i.e., the destination, by driving the vehicle according to the guidance of the vehicle navigation system.

However, such a route guidance technique is not to the shop's advantage. Particularly, for a shop located in the suburbs, that is, a shop that is difficult to locate, it is likely that the shop cannot attract customers efficiently in spite of the huge parking area, because it is difficult for people to set the destination in their vehicle navigation system.

SUMMARY OF THE INVENTION

Accordingly, it is an object of this invention to provide a technology of route guidance that can make it possible for vehicle users to be guided to shops or facilities without requiring a complicated operation of the navigation system, and also to give both the users and shops or facilities an economic benefit.

The first aspect of the invention involves the distribution of memory mediums storing position data of specific facilities that can be read as position data of a destination on the map data of a vehicle navigation apparatus.

The memory medium is not limited to a CD-ROM or a DVD-ROM but can also be any medium that has space for storing and can be read externally, such as, for example, an IC card, a DAT, a Smart Media, a SD card, a compact flash memory card, or a PCMCIA card. It is preferable, however, that the medium be inexpensive and capable of being distributed widely.

Moreover, the specific position data stored in the memory medium is not limited to the longitude data and latitude data of the specific shop or facilities, but can also be any data that can be matched with the map data stored in the vehicle navigation apparatus side, such as the data which can be set as the destination to the vehicle navigation apparatus, or the phone number data of the specific shop.

Furthermore, it is also available to store the data of a coupon in the memory medium. The data of the coupon is, for example, the cash-data, the data corresponding to cash that can be paid in the shop, the discount-rate-data or the discount-data itself.

When a user sets or inserts this memory medium to a fixed location (for example, into a memory medium reader) of the navigation system, the position data of the specific facilities is read and is set as the destination. Then, the vehicle navigation apparatus starts route guiding to the destination. After arriving at the destination, the user can shop or obtain the benefit of a discount at the facilities (the shop) by using the memory medium.

As described above, a vehicle user can be guided to the facilities (shop) without having to set the destination, because the destination is set automatically by inserting the memory medium into the vehicle navigation apparatus. In addition, storage of the data of a coupon in the memory medium can promote the rate of customers using the memory medium; therefore, it can make efficiency of gathering customers higher.

DETAILED DESCRIPTION OF PREFERRED EMBODIMENTS

Figure 1:
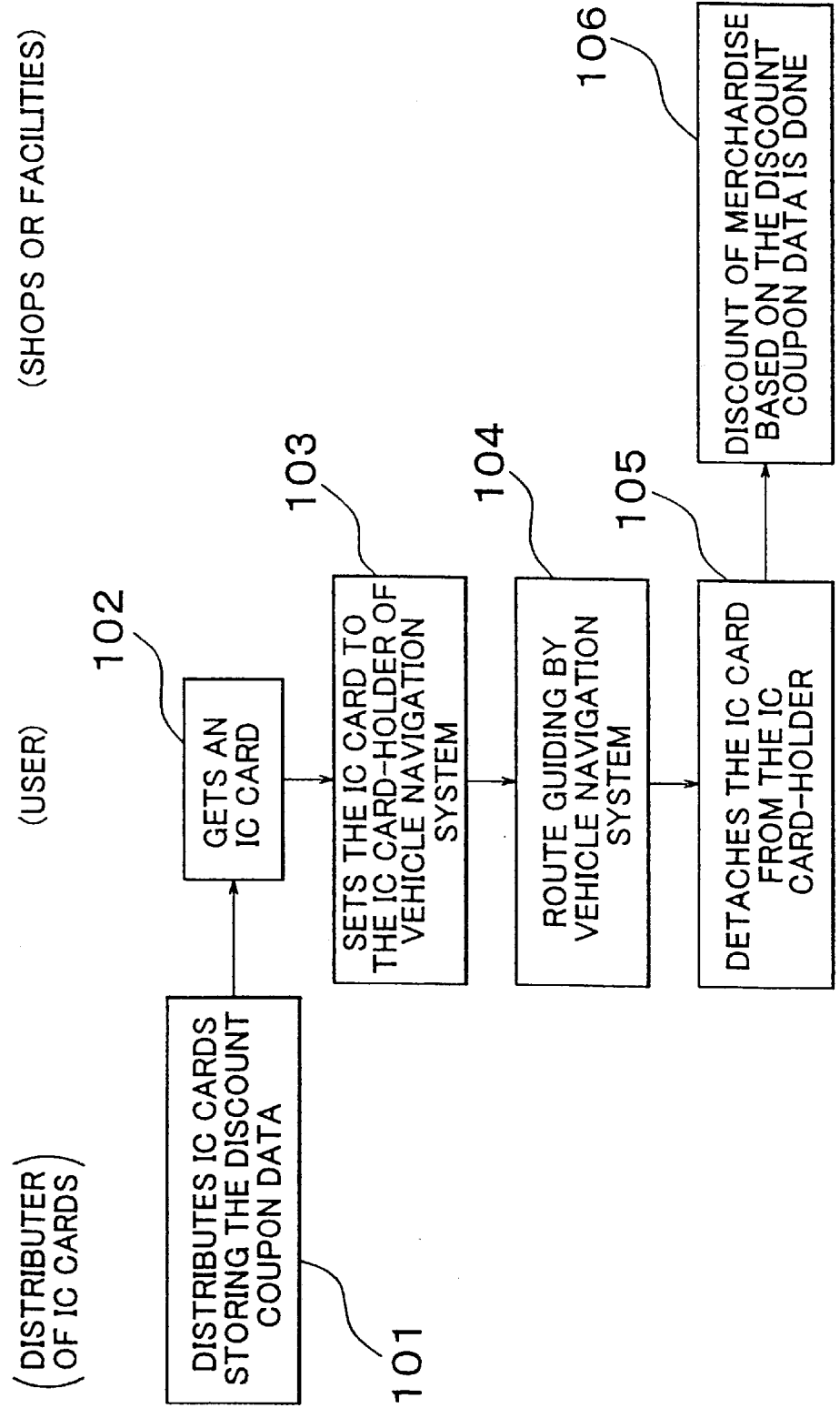
FIG. 1 is a block diagram showing a process for a vehicle user to use a memory medium according to this invention.

Preferred embodiments of the invention are described below by referring to the accompanying drawings. FIG. 1 roughly shows the way to use an IC card (memory medium).

Figure 3:
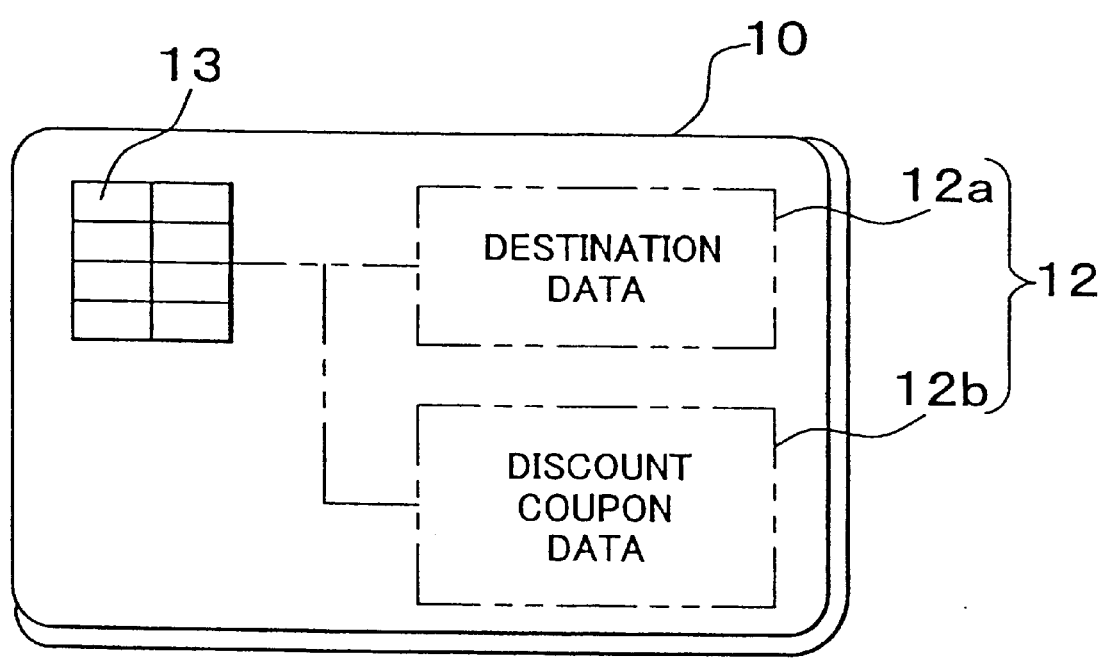
FIG. 3 is an illustration of an IC card in an embodiment.

First, as shown in FIG. 3, the IC cards storing the position data (the destination data 12a) of the shop which wants to advertise itself and the discount coupon data 12b for shopping at the shop are distributed to users as "IC Card with the Discount Coupon", for example, by hand or direct-mail (step 101). It is preferable that information (indicia) such as "XX shop Discount Coupon Card" Prepaid Amount: $5-" is printed on this IC card. Such a display makes the purpose of the card readily apparent to the user or clerks in the shop.

A user obtains this card 10 (step 102) before he sets the card into the IC card-holder 8 of the vehicle navigation apparatus (step 103). When the control apparatus 1 of the vehicle navigation apparatus recognizes setting of the IC card 10 into the IC card-holder 8, the control apparatus 1 generates an interruption signal before reading the destination data 12a from the IC card 10. After reading the data 12a, the data 12a is set as the destination. Then the control apparatus 1 starts route guidance (step 104).

When the user arrives at the shop, he takes the IC card 10 from the IC card-holder 8 and enters the shop (step 105). Next, the user shows a clerk the IC card when he does his shopping at the shop or uses the facilities. The clerk sets the IC card 10 into a card-reader (not illustrated), then the discount coupon data 12b is read. After this process, the discount which corresponds to the read discount coupon data 12b is performed (step 106). That is, the coupon is redeemed.

Figure 2:
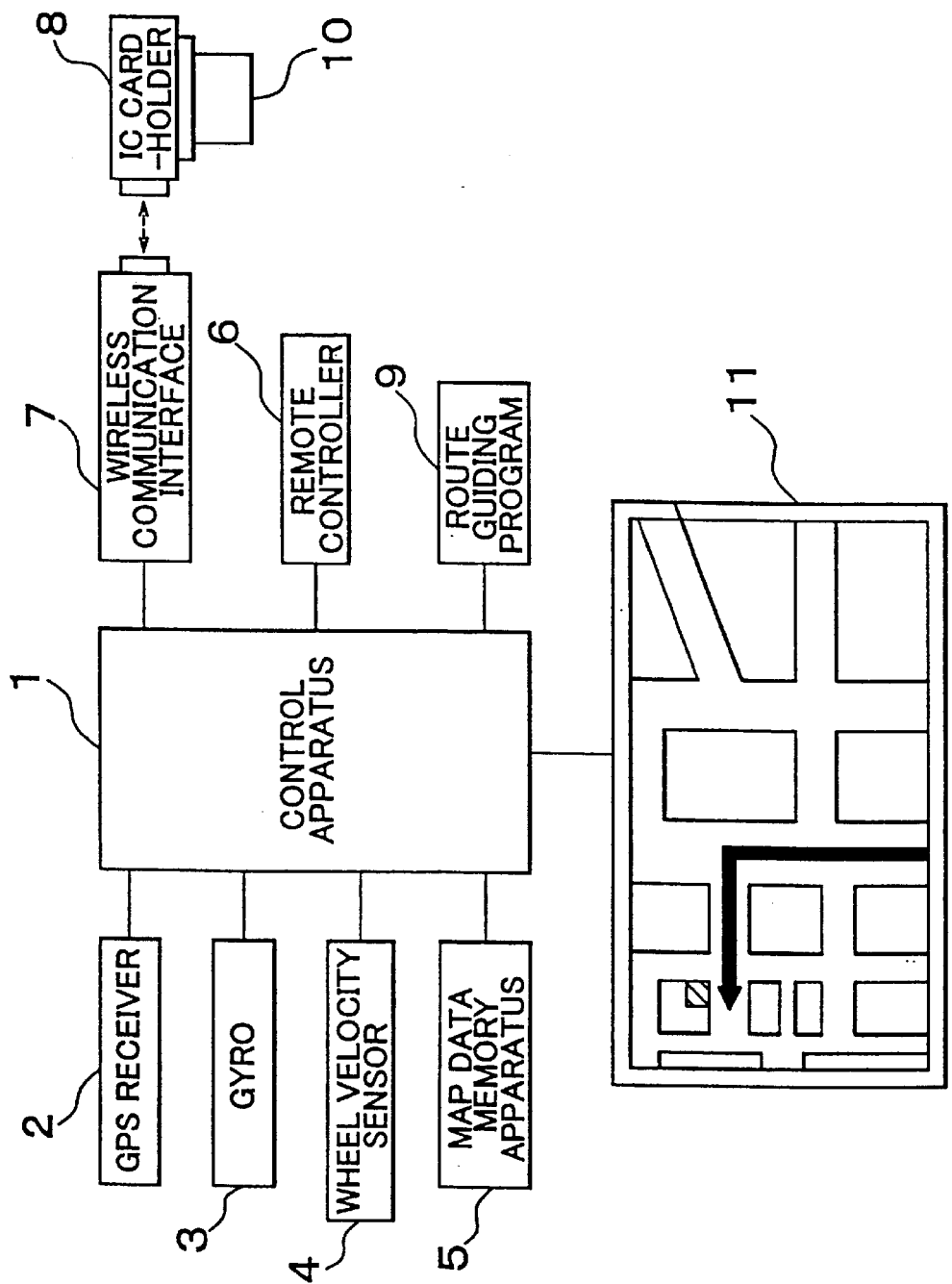
FIG. 2 is a block diagram showing a vehicle navigation apparatus in an embodiment.

FIG. 2 is a block diagram showing a vehicle navigation apparatus of this embodiment. In this embodiment, the vehicle has a GPS receiver 2, a gyro 3, and a wheel velocity sensor 4. The GPS receiver 2 outputs signals based on the place where the vehicle is presently located by receiving electric waves from at least three artificial satellites. The gyro 3 outputs signals based on horizontal angular velocity of the vehicle.

The wheel velocity sensor 4 outputs mileage signals based on the mileage of the vehicle calculated by counting revolutions of the wheels. Basically, revision of information about the position received from GPS receiver 2 is done by the gyro 3 and the wheel velocity sensor 4 to make the estimate of the place where the vehicle is presently located more exact. In addition, revision by F.M. (Frequency Modulation) wave is also preferable.

A map data memory apparatus 5 comprises a CD-ROM drive or a DVD-ROM drive and has a function of outputting the map data to the control apparatus 1.

A remote controller 6 is for the user to input data into the control apparatus 1, the longitude data and latitude data, the phone number data, or the address data of the destination and so on, and for operating the displayed map data, for example, zooming in and out or shifting the area on a display apparatus 11, which is described later.

A route guiding program 9 is the program that the control apparatus 1 has in its ROM and so on. The display apparatus 11 is, for example, a color liquid crystal display apparatus, and is capable of displaying information about the map or other information. Display apparatus 11 receives a video signal from the control apparatus 1.

A wireless communication interface 7 is used for transmitting data to the outer IC card-holder 8 and for receiving data from it by wireless communication. For example, Bluetooth wireless technology is available for that communication.

The wireless communication by Bluetooth has, for example, standards of 2.4 MHz frequency Band, 1 Mbps transmission rate and about 10 m range of reaching area. For security, Spread Spectrum Communication and frequency hopping technology, that change frequency channel 1600 times a second, can be used for this wireless communication system. The wireless communication interface like this is a modular apparatus.

The IC card-holder 8, which is attached close to the cockpit of the vehicle, also has another modular wireless communication interface. The control apparatus 1 detects periodically whether the IC card 10 is set into the IC card-holder 8 in the vehicle by a timer program through the wireless communication interface 7.

The IC card 10 is, as illustrated in FIG. 3, a contact-type IC card, which has electrodes 13 and a modular memory 12 where the destination data 12a and the discount coupon data 12b are stored separately.

Figure 4:
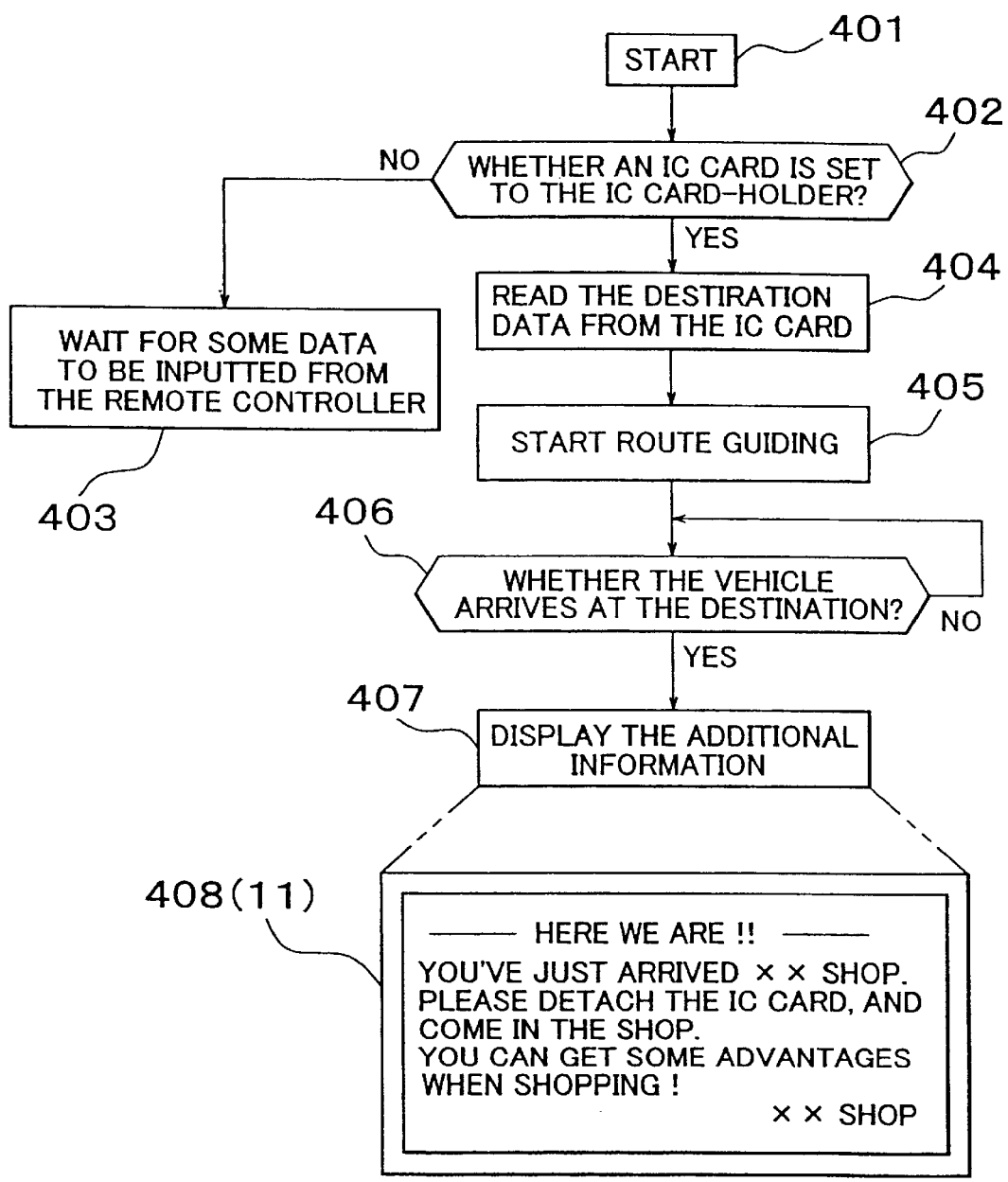
FIG. 4 is a flowchart showing a control process of a control apparatus in an embodiment.

Next, referring to FIG. 4, a control process performed by the control apparatus 1 is explained. The control apparatus 1 detects through the wireless communication interface 7 whether the IC card 10 is set into the IC card-holder 8 (step 401, 402). If it detects that the IC card 10 is not set, it enters the waiting mode where it waits for some data to be input from the remote controller 6 (step 403).

If the control apparatus 1 recognizes that the IC card 10 is set, it reads the destination data 12a from the IC card 10 (step 404).

The control apparatus 1 sets the destination based on the destination data 12a (for example, the longitude data and latitude data) read from the IC card 10. Next, the control apparatus 1 reads the route guiding program 9 and calculates a route to guide the user by using the map data read from the map data memory apparatus 5. Then, the control apparatus starts to guide the driver by displaying a visible route on the display apparatus 11 or by providing audible guidance at intersections etc. according to the calculated route (step 405).

Now, it is also possible for the control apparatus 1 to calculate a route after consideration of a traffic condition by obtaining traffic information through a communication apparatus that is not illustrated. In this case, a cellular phone can be used as the communication apparatus, and communication between the cellular phone and the control apparatus 1 can be made through the wireless communication interface 7.

Thereafter, if the control apparatus 1 recognizes that the vehicle has arrived at or comes close to the destination based on the position where the vehicle is presently located (step 406), the control apparatus 1 reads the additional information (not illustrated) of the discount coupon data 12b and displays it on the display apparatus 11 after reading the discount coupon data 12b itself (step 407). An appearance of the display apparatus 11 which is displaying the additional information about the discount coupon data 12b is illustrated as 408 in FIG. 4.

In this embodiment, the message as the additional information instructs the user to detach the IC card 10 from the IC card-holder 8 and use it at the shop which is set as the destination. The user shows the IC card 10 to a clerk at the shop when shopping or using the facilities. When this IC card 10 is set to an IC card-reader (not illustrated) of the shop, the discount coupon data 12b is read from the IC card 10 and the discount of merchandise based on the discount coupon data 12b is performed.

While in this embodiment, IC card-holder has a modular wireless communication interface within, it is also possible that IC card 10 itself has this interface. In such a case, the IC card-holder's modular wireless communication interface is not necessarily needed. As an IC card in this situation communicates directly with the wireless communication interface 7 of the vehicle navigation apparatus, it is also possible that the IC card can be kept in the user's pocket.

In addition, the wireless communication interface 7 and remote controller 6 are separated in this embodiment as illustrated in FIG. 2; however, it is also possible that the remote controller has the wireless communication interface 7 within. Furthermore, an ordinary IC card is used in this embodiment as a memory medium. It is also possible to use an ETC card, which is used in electronic toll collection system (ETC). In such a case, the card can be used both for a highway toll collection system and for this invention.

Furthermore, it is possible to use other inexpensive memory mediums as distributed mediums, such as CD-ROM, CD-R, CD-RW, DVD-ROM, or DVD-RW etc. Such memory mediums which have large capacity can make efficiency of gathering customers higher, because a customer can use the distributed medium without a vehicle navigation apparatus by virtue of the medium's capability of storing not only the destination data 12a, but also the map data around the destination and the route guiding program.

Figure 5:
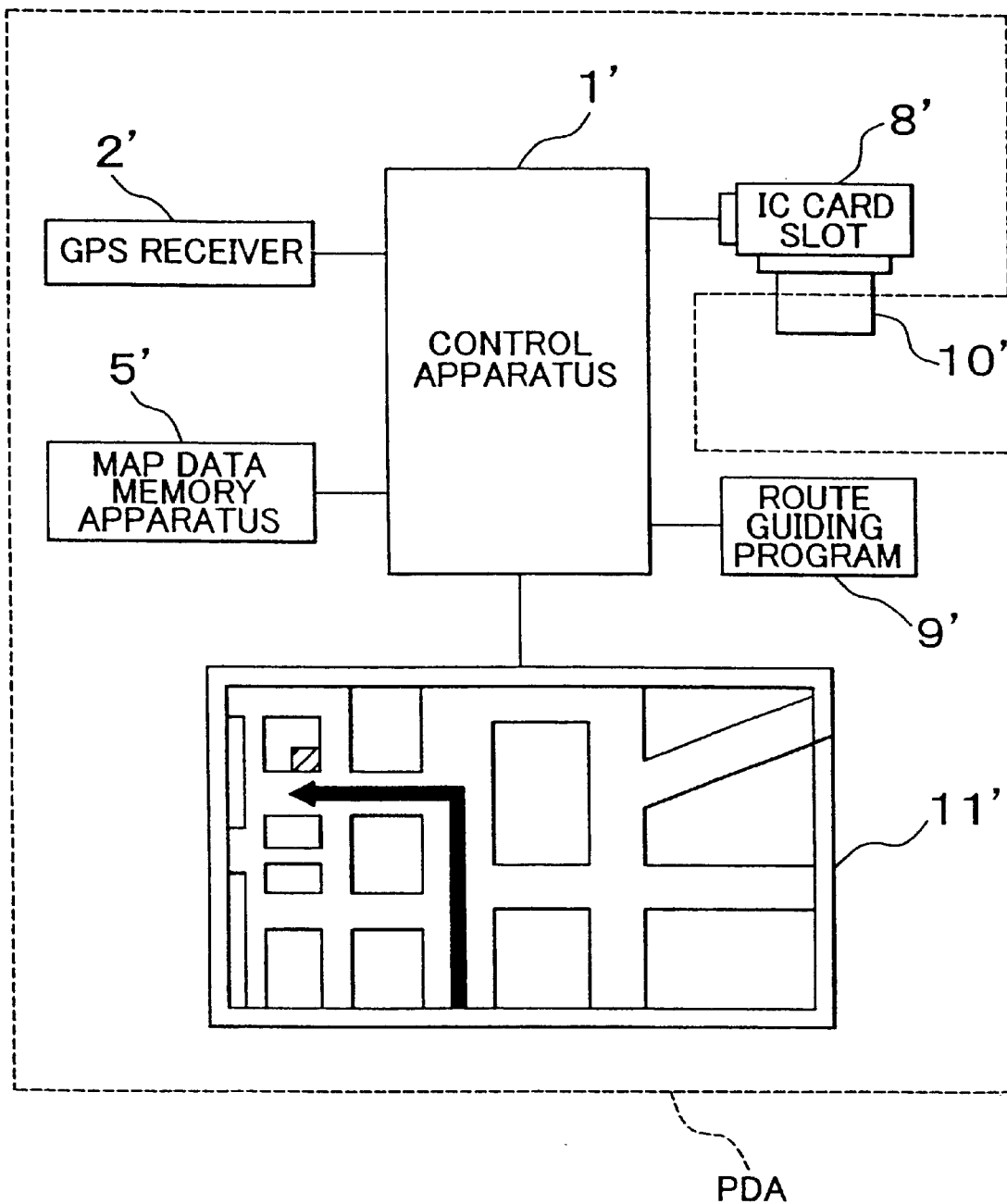
FIG. 5 is a block diagram of a hand-held navigation apparatus.

In the above embodiment, the vehicle has a built-in navigation apparatus. This invention, however, applies to a hand-held navigation apparatus, that is, a mobile navigation apparatus. For example, applying the function of this invention to a PDA (Personal Data Assistant), which can be carried by a pedestrian, can make efficiency of gathering even walking customers higher. In this case, this invention can be practiced promptly by linking with a location information service which includes a GPS receiver 2' connected to the PDA or a PHS (Personal Handy phone System) etc. If a PDA has an IC card-slot 8', it can read directly a destination data after setting an IC card 10' to the slot 8'. FIG. 5 is a block diagram showing a hand-held navigation apparatus in such an embodiment. This apparatus includes a control apparatus 1', a map data memory apparatus 5', a route guiding program 9' and a display 11' similar to the FIG. 2 embodiment. Needless to say, said Bluetooth wireless technology is also available for this communication.

In the vehicle navigation apparatus or the hand-held navigation apparatus of the invention, a user can be guided to the facilities (shop) without having to set the destination, because the destination is set automatically by placement of the memory medium into the navigation apparatus. In addition, storage of the discount coupon data in the memory medium can promote the rate of customers using the memory medium; therefore, it can make efficiency of gathering customers higher.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A navigation apparatus, comprising:
    a memory medium reader that reads a memory medium which has: (i) position data of at least one specific facility that can be read as destination data and (ii) discount coupon data that can be redeemed at said at least one specific facility, wherein the discount coupon data is read from the memory medium when the memory medium is detached from the memory medium reader and presented inside said at least one specific facility to redeem the discount; and
    a control apparatus that sets a destination based on said position data read from said memory medium; calculates a route to guide a user to the destination; and indicates said route to the user.

2. A navigation apparatus according to claim 1, wherein the navigation apparatus is a built-in vehicle navigation apparatus.

3. A navigation apparatus according to claim 1, wherein the navigation apparatus can be carried by a pedestrian.

4. A navigation apparatus according to claim 1, wherein the navigation apparatus calculates a route after consideration of a traffic condition.

5. A navigation apparatus according to claim 1, wherein the control apparatus issues a message to instruct the user to detach the memory medium from the memory medium reader and use the memory medium at the at least one specific facility.

6. A navigation system, comprising:
    a memory medium which is distributed to a user by mail or hand based on a request of an advertiser and that stores: (i) position data of specific facilities related to said advertiser and (ii) discount coupon data that can be redeemed at the specific facilities, wherein the discount coupon data is read from the memory medium when the memory medium is detached from the memory medium reader and presented inside said specific facilities to redeem the discount; and
    a navigation apparatus that reads said position data from said memory medium, sets a destination based on said position data and guides the user to said facilities.

7. A navigation system according to claim 6, wherein the navigation apparatus is a built-in vehicle navigation apparatus.

8. A navigation system according to claim 6, wherein the navigation apparatus can be carried by a pedestrian.

9. A navigation system according to claim 6, wherein Bluetooth wireless technology is used for a communication between the memory medium and the navigation apparatus.

10. A navigation system according to claim 6, wherein the navigation apparatus calculates a route after consideration of a traffic condition.

11. A navigation system according to claim 6, wherein the navigation apparatus issues a message to instruct the user to detach the memory medium from the navigation apparatus and use the memory medium at the specific facilities.

12. A method for guiding a user to specific facilities by a memory medium, the method comprising:
    detecting that said memory medium, which has position data of specific facilities, is provided at a specific location;
    generating an interruption signal and quitting an ongoing route guidance operation if it is detected that the memory medium is provided at said specific location;
    reading said position data of said specific facilities from said memory medium and selecting said position data as a new destination, wherein said new destination is selected automatically when the memory medium is detected to be provided at said specific location; and
    guiding the user to said automatically selected new destination.

13. A method for guiding a user to specific facilities by a memory medium, the method comprising:
    detecting that said memory medium, which has position data of specific facilities and discount coupon data that can be redeemed at said specific facilities, is provided at a specific location;
    generating an interruption signal and quitting an ongoing route guidance operation if it is detected that the memory medium is provided at said specific location;
    reading said position data of said specific facilities from said memory medium and selecting said position data as a new destination, wherein said new destination is selected automatically when the memory medium is detected to be provided at said specific location;
    providing information about said discount coupon data; and
    guiding the user to said automatically selected new destination.

14. A computer readable memory medium that stores a program, the program comprising instructions to:
    detect that another memory medium, which has position data of specific facilities, is provided at a specific location,
    generate an interruption signal and quit an ongoing route guidance operation if it is detected that said another memory medium is provided at said specific location,
    read said position data of said specific facilities from said another memory medium,
    select said position data as a new destination, wherein said new destination is selected automatically when the another memory medium is detected to be provided at said specific location; and
    guide a user to said automatically selected new destination.

* * * * *